(12) United States Patent
Shoop et al.

(10) Patent No.: US 11,522,619 B2
(45) Date of Patent: *Dec. 6, 2022

(54) FREQUENCY PAIRING FOR DEVICE SYNCHRONIZATION

(71) Applicant: Rovi Guides, Inc., San Jose, CA (US)

(72) Inventors: David D. Shoop, San Jose, CA (US); Dylan M. Wondra, Mountain View, CA (US)

(73) Assignee: ROVI GUIDES, INC., San Jose, CA (US)

( * ) Notice: Subject to any disclaimer, the term of this patent is extended or adjusted under 35 U.S.C. 154(b) by 855 days.

This patent is subject to a terminal disclaimer.

(21) Appl. No.: 16/296,953

(22) Filed: Mar. 8, 2019

(65) Prior Publication Data

US 2020/0287632 A1 Sep. 10, 2020

(51) Int. Cl.
*H04B 11/00* (2006.01)
*H04B 7/155* (2006.01)
*H04B 10/116* (2013.01)

(52) U.S. Cl.
CPC ......... *H04B 11/00* (2013.01); *H04B 7/15521* (2013.01); *H04B 10/116* (2013.01)

(58) Field of Classification Search
CPC .. H04B 11/00; H04B 7/15521; H04B 10/116; G10L 15/22; G10L 19/018; G08B 13/19671; G06F 3/167
See application file for complete search history.

(56) References Cited

U.S. PATENT DOCUMENTS

| 9,318,912 | B2 | 4/2016 | Baarman et al. |
| 10,339,936 | B2 * | 7/2019 | Storti ................... H04H 20/31 |
| 10,956,123 | B2 * | 3/2021 | Shoop ................... H04W 12/68 |
| 2005/0024488 | A1 | 2/2005 | Borg |
| 2008/0002606 | A1 | 1/2008 | Cheung et al. |
| 2008/0155633 | A1 | 6/2008 | Watson |

(Continued)

FOREIGN PATENT DOCUMENTS

WO   WO-2020185636 A1 *  9/2020 ........... H04B 10/116

OTHER PUBLICATIONS

Lisnr Case Studies Lisnr The Data-Over-Audio Leader, Oct. 15, 2018, p. 1/1, Discovery Channel. https://lisnr.com/resources/case-studies/ (Last visited Mar. 8, 2019).

(Continued)

*Primary Examiner* — Daniel Pihulic
(74) *Attorney, Agent, or Firm* — Haley Guiliano LLP

(57) ABSTRACT

A device may include a processor, a receiver, and a transmitter. The receiver may be configured to receive a content signal. The transmitter may be configured to transmit the content signal. The transmitter may be configured to transmit an associated inaudible signal. The content signal, the associated inaudible signal, or both, may be transmitted to one or more electronic devices. Each of the one or more electronic devices may be configured with audio interfaces. The receiver may be configured to receive a respective message from each of the one or more electronic devices. Each respective message may be based on the associated inaudible signal. Each respective message may include a respective electronic device identifier. The transmitter may be configured to transmit one of the respective messages.

20 Claims, 6 Drawing Sheets

(56) References Cited

U.S. PATENT DOCUMENTS

| | | |
|---|---|---|
| 2011/0002471 A1 | 1/2011 | Wihardja et al. |
| 2011/0165912 A1 | 7/2011 | Wang et al. |
| 2011/0214143 A1 | 9/2011 | Rits et al. |
| 2012/0075083 A1 | 3/2012 | Isaacs |
| 2012/0295560 A1 | 11/2012 | Mufti |
| 2013/0080092 A1 | 3/2013 | Yogeeswaran et al. |
| 2013/0198786 A1 | 8/2013 | Cook et al. |
| 2014/0029768 A1 | 1/2014 | Hong et al. |
| 2015/0113094 A1 | 4/2015 | Williams et al. |
| 2015/0162006 A1 | 6/2015 | Kummer |
| 2015/0169066 A1 | 6/2015 | Plagemann et al. |
| 2015/0188643 A1 | 7/2015 | Ansell |
| 2015/0382047 A1 | 12/2015 | Van Os et al. |
| 2016/0019901 A1 | 1/2016 | Topchy et al. |
| 2016/0165333 A1 | 6/2016 | Gokingco et al. |
| 2017/0118697 A1 | 4/2017 | Soldati et al. |
| 2018/0322881 A1 | 11/2018 | Min et al. |
| 2018/0343481 A1 | 11/2018 | Loheide et al. |
| 2018/0350356 A1 | 12/2018 | Garcia |
| 2019/0043503 A1 | 2/2019 | Bauer et al. |
| 2020/0082816 A1 | 3/2020 | Mahajan |
| 2020/0286474 A1 | 9/2020 | Shoop et al. |
| 2020/0286503 A1 | 9/2020 | Shoop et al. |
| 2020/0287632 A1* | 9/2020 | Shoop ................ H04B 7/15521 |
| 2020/0356338 A1* | 11/2020 | Shoop ................... H04N 21/47 |
| 2021/0241767 A1 | 8/2021 | Shoop et al. |
| 2021/0255827 A1 | 8/2021 | Shoop et al. |

OTHER PUBLICATIONS

International Search Report in corresponding International Patent Application No. PCT/US2020/021610, dated Jun. 9, 2020, 4 pgs.
International Search Report in corresponding International Patent Application PCT/US2020/031564 dated Aug. 18, 2020, 16 pages.
U.S. Appl. No. 16/296,928, filed Mar. 8, 2019.
U.S. Appl. No. 16/296,948, filed Mar. 8, 2019.
U.S. Appl. No. 16/406,813, filed May 8, 2019.

* cited by examiner

FREQUENCY PAIRING FOR DEVICE SYNCHRONIZATION

TECHNICAL FIELD

This disclosure relates to systems and methods for frequency pairing for device synchronization.

BACKGROUND

Electronic devices, such as voice-activated electronic devices, do not act unless activated by an audible wake word. These audible wake words detract from natural interactions between users and the voice-activated electronic devices. To remove the burden from the user to activate the voice-activated electronic device, it would be desirable to silently activate the voice-activated electronic device. It would be desirable to activate the voice-activated device using a non-interfering communication such that the content for user consumption is not interrupted. It would also be desirable for the system to distinguish audio cues from the content and from the user. It would also be desirable to ensure that the voice-activated electronic device perform the specific function intended by the user. It would also be desirable for the system to communicate without requiring prior pairing with the voice-activated electronic device. It would also be desirable to communicate with multiple and varying types of voice-activated electronic devices simultaneously.

SUMMARY

Disclosed herein are implementations of methods and systems for frequency pairing for device synchronization. Frequency pairing for device synchronization may be used in an advertisement context to allow a user to naturally and seamlessly interact with content to receive information regarding a particular product. Frequency pairing for device synchronization may be used in an audiobook context to allow a user to naturally and seamlessly interact with the audiobook to control the direction of the story. Frequency pairing for device synchronization may be used in a camera system to allow a user to naturally and seamlessly alert law enforcement of a potential intruder.

In an aspect, a device may include a processor, a receiver, and a transmitter. The receiver may be configured to receive an audible signal and an inaudible signal. The inaudible signal may be associated with a content characteristic of the audible signal. The transmitter may be configured to transmit the audible signal, the inaudible signal, or both to one or more electronic devices having audio interfaces. The receiver may be configured to receive a respective message from each of the one or more electronic devices. Each respective message may be based on the content characteristic. Each respective message may include a respective electronic device identifier. The transmitter may be configured to transmit one of the respective messages.

In an aspect, a device may include a processor, a receiver, and a transmitter. The receiver may be configured to receive a content signal. The transmitter may be configured to transmit the content signal. The transmitter may be configured to transmit an associated inaudible signal. The content signal, the associated inaudible signal, or both, may be transmitted to one or more electronic devices. Each of the one or more electronic devices may be configured with audio interfaces. The receiver may be configured to receive a respective message from each of the one or more electronic devices. Each respective message may be based on the associated inaudible signal. Each respective message may include a respective electronic device identifier. The transmitter may be configured to transmit one of the respective messages.

In an aspect, a method may include receiving a first inaudible signal. The first inaudible signal may be associated with a content signal. The method may include receiving an input. The method may include transmitting a second inaudible signal. The second inaudible signal may be responsive to the input. The second inaudible signal may indicate to an electronic device to ignore the first inaudible signal. The method may include transmitting a message. The message may be based on the input, and a content identifier of the first inaudible signal, or both.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Typical systems for interactive content consumption require a user to perform multiple steps to activate an electronic device in the context of the content, resulting in a disjointed and undesirable user experience. The embodiments disclosed herein may augment user interaction with content by providing seamless communication between content devices and other electronic devices using inaudible frequencies. The inaudible frequencies may be paired with audible frequencies to enable a non-intrusive and distinct path for electronic device commands without requiring the user to activate the electronic device to initiate the path.

Figure 1:
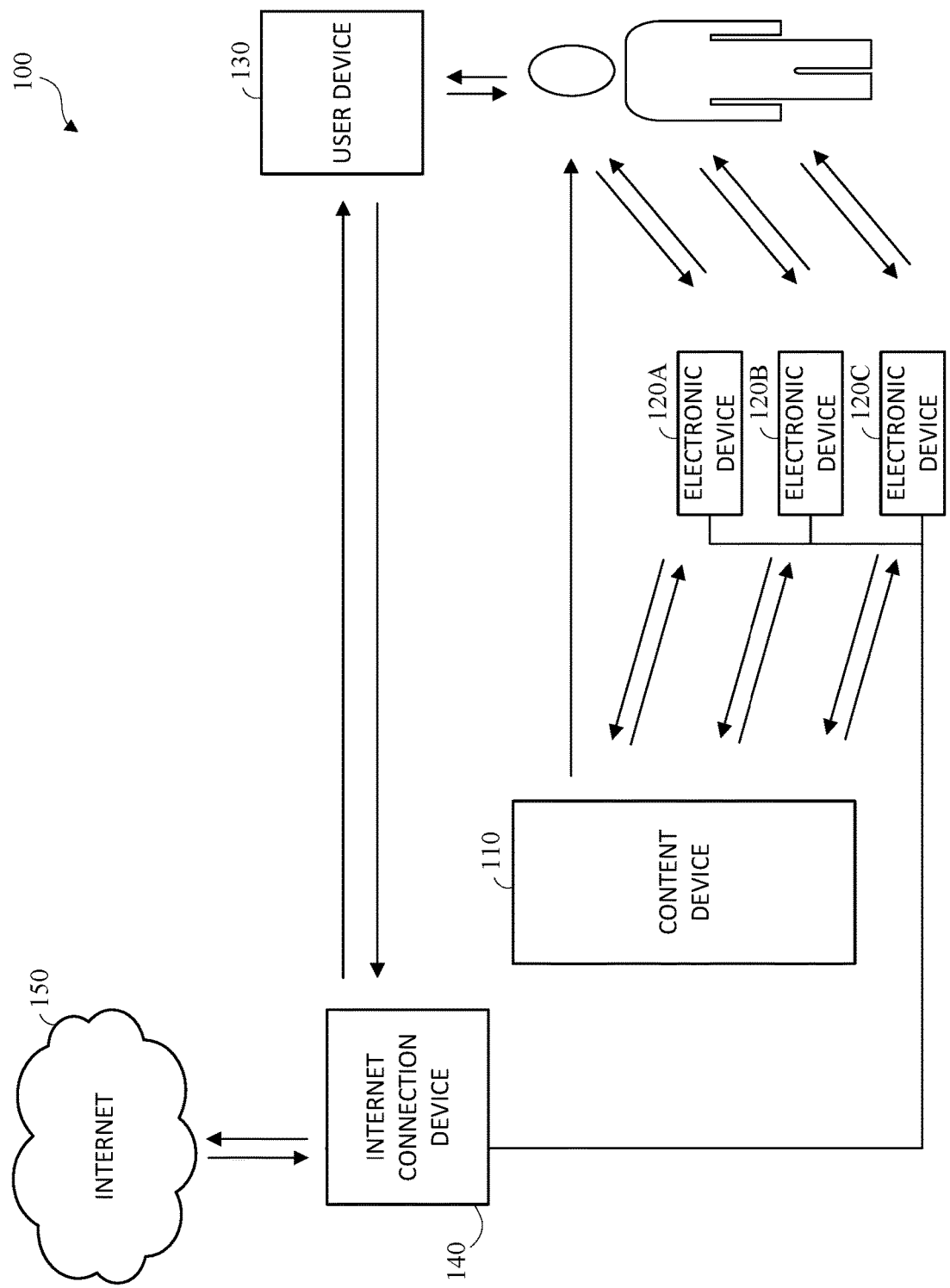
FIG. 1 is a block diagram of an example of a system for content consumption.

FIG. 1 is a block diagram of an example of a system 100 for content consumption. System 100 includes a content device 110, an electronic devices 120A, 120B, 120C, and a user device 130. Any number of electronic devices may be included in the system 100, and three are shown in FIG. 1 merely as an example. Each electronic device 120A, 120B, 120C is configured to communicate with the user, the content device 110, and an internet connection device 140. The internet connection device 140 is configured to communicate with the user device 130 and internet 150.

The content device 110 is configured to transmit content to the user. Examples of the content device 110 include, and are not limited to, a television (TV), a personal computer (PC), a tablet, a mobile phone, a gaming device, a satellite receiver, a terrestrial radio receiver, an audio receiver, a set-top-box (STB), a speaker, a camera, a personal wearable device, or an augmented reality/virtual reality (AR/VR) device. The content may include audio content, video content, or both. Audio content may include streaming audio, recorded audio, broadcast audio, point-to-point audio, or any combination thereof. Video content may include streaming video, recorded video, broadcast video, point-to-point video, or any combination thereof. The audio content, video content, or both, may be in real-time or pre-recorded.

Each electronic device 120A, 120B, 120C may be any device configured to interface with the user. Each electronic device 120A, 120B, 120C may include multi-mode capabilities, and may include multiple transceivers for communicating with different wireless networks over different wireless links. For example, each electronic device 120A, 120B, 120C may be configured to communicate with a device employs a Bluetooth radio technology, and with a base station that employs an IEEE 802 radio technology. For example, each electronic device 120A, 120B, 120C may be a voice-activated electronic device, a personal hub used to connect multiple devices that use common communication protocols, a TV, a PC, a tablet, a mobile phone, a gaming device, a satellite receiver, a terrestrial radio receiver, an audio receiver, an STB, a speaker, a camera, a personal wearable device, an AR/VR device, or any device configured to interface with the user.

The user device 130 may be any device configured to interface with the user. The user device 130 may include multi-mode capabilities, and may include multiple transceivers for communicating with different wireless networks over different wireless links. For example, the user device 130 may be configured to communicate with a base station that employs a cellular-based radio technology, and with the base station that employs an IEEE 802 radio technology. The user device 130 may include, for example, a PC, a tablet, a mobile phone, a gaming device, a personal wearable device, an AR/VR device, or any device configured to interface with the user.

The internet connection device 140 may be a wireless router, Home Node B, Home eNode B, or access point, for example, and may utilize any suitable radio access technology for facilitating wireless connectivity in a localized area, such as a home, a place of business, an educational facility, a vehicle, and the like. The internet connection device 140 may communicate with the user device 130 over an air interface, which may be any suitable wireless communication link, for example, radio frequency (RF), microwave, infrared (IR), ultraviolet (UV), visible light, and the like. The internet connection device 140 may implement a radio technology such as IEEE 802.11 to establish a wireless local area network (WLAN). The internet connection device 140 may implement a radio technology such as IEEE 802.15 to establish a wireless personal area network (WPAN). The internet connection device 140 may utilize a cellular-based radio access technology. Example cellular-based radio access technologies include wide-band code division multiple access (WCDMA), Global System for Mobile communications (GSM), Long Term Evolution (LTE), LTE-Advanced (LTE-A), and the like. As shown in FIG. 1, the internet connection device 140 may have a direct connection to the Internet 150. Alternatively, the internet connection device 140 may access the Internet 150 via a core network (not shown). The Internet 150 may include a global system of interconnected computer networks and devices that use common communication protocols, such as the transmission control protocol (TCP), user datagram protocol (UDP) and the internet protocol (IP) in the TCP/IP internet protocol suite.

Figure 2:
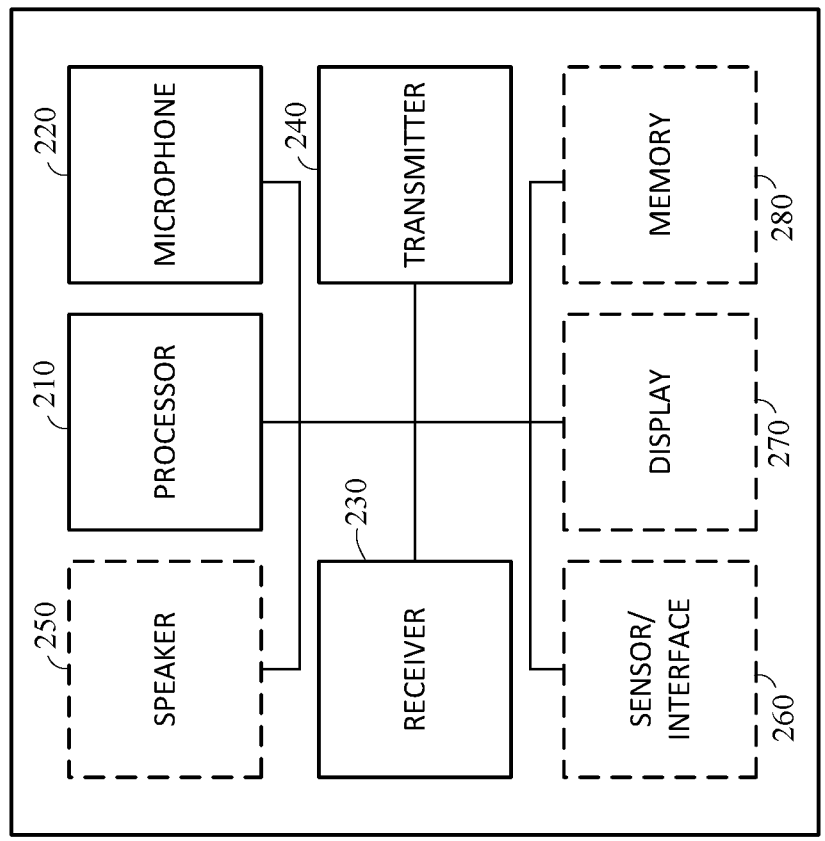
FIG. 2 is a block diagram of an example of an electronic device capable of receiving audible and inaudible inputs in accordance with one or more embodiments of this disclosure.

FIG. 2 is a block diagram of an example of an electronic device 200 capable of receiving audible and inaudible inputs. Example implementations of the electronic device 200 may include the content device 110, any of electronic devices 120A, 120B, and 120C, and the user device 130 of FIG. 1. The electronic device 200 includes a processor 210, a microphone 220, a receiver 230, and a transmitter 240. In some implementations, the receiver 230 and transmitter 240 may be combined into a single transceiver unit. In some implementations, the electronic device 200 may include a speaker 250, a sensor/interface 260, a display 270, a memory 280, or any combination thereof.

The processor 210 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 210 may perform signal coding, data processing, power control, input/output processing, and/or any other functionality that enables the electronic device 200 to operate. The processor 210 may be coupled to the receiver 230 and the transmitter 240. While FIG. 2 depicts the processor 210, the receiver 230, and the transmitter 240 as separate components, it will be appreciated that the processor 210, the receiver 230, and the transmitter 240 may be integrated together in an electronic package or chip.

The microphone 220 is coupled to the processor 210 and may be configured to receive audible and inaudible inputs. The microphone 220 may include multiple microphones to extend the coverage area of audio capture. An audible input may include any audible signals at frequencies perceptible to a human ear from about 20 Hz to about 20,000 Hz. An inaudible input may include any inaudible signals at frequencies that are not perceptible to the human ear from below 20 Hz and above 20,000 Hz. The microphone 220 may be configured to detect any auditory command, for example, a user voice as a user input.

The receiver 230 may be configured to receive signals from an internet connection device, for example internet connection device 140 shown in FIG. 1. In some embodiments, the receiver 230 may be an antenna configured to receive inaudible inputs such as RF signals. In some embodiments, the receiver 230 may be a detector configured to receive inaudible inputs such as IR, UV, or visible light signals, for example. In some embodiments, the receiver 230 may be configured to receive both RF and light signals. It will be appreciated that the receiver 230 may be configured to receive any combination of wireless signals.

The transmitter 240 may be configured to transmit signals to an internet connection device, for example internet connection device 140 shown in FIG. 1. In some embodiments, the transmitter 240 may be an antenna configured to transmit RF signals. In some embodiments, the transmitter 240 may be an emitter configured to transmit IR, UV, or visible light signals, for example. In some embodiments, the transmitter 240 may be configured to transmit both RF and light signals. It will be appreciated that the transmitter 240 may be configured to transmit any combination of wireless signals.

The speaker 250 may be coupled to the processor 210 and may be configured to emit audible and inaudible signals. The speaker 250 may include multiple speakers to extend the sound field.

The sensor/interface 260 may be coupled to the processor 210 and may include one or more software and/or hardware modules that provide additional features, functionality and/or wired or wireless connectivity. For example, the sensor/interface 260 may include an accelerometer, an e-compass, a satellite transceiver, an image sensor (for photographs or video), a universal serial bus (USB) port, a vibration device, a television transceiver, a hands free headset, a Bluetooth® module, a frequency modulated (FM) radio unit, a digital music player, a media player, a video game player module, a keyboard, an Internet browser, and the like. The sensor/interface 260 may be configured to detect motion-based or gesture-based commands. The sensor/interface 260 may be configured to perform facial recognition. For example, facial recognition may be used to correlate a user response to a specific user and to determine which user responses to ignore. For example, if a user is not recognized via facial recognition, a response from that user may be ignored. In some implementations, the sensor/interface 260 may be configured to detect a sign gate or a walk gate of a user to identify the user. A sign gate may function as a virtual fingerprint of a user based on how the user performs specific gestures or signs. A walk gate may function as a virtual fingerprint of a user based on a unique walking gate of the user.

The display 270 may be coupled to the processor 210 and may be a liquid crystal display (LCD) display unit, a light emitting diode (LED) display unit, or an organic light-emitting diode (OLED) display unit. The display 270 may be configured to receive user input, for example, the display 270 may be a capacitive touch display in some embodiments.

The memory 280 may be coupled to the processor 210. The memory 280 may include volatile memory, persistent storage, or both. Volatile memory may include random access memory (RAM), dynamic random access memory (DRAM), static random access memory (SRAM), and the like. Persistent storage may include read-only memory (ROM), a hard disk, or any other type of memory storage device. Persistent storage may include a removable storage element such as a memory stick, a secure digital (SD) memory card, and the like.

In a typical situation, multiple users may be in close proximity to each other and consuming the same content. Each of the multiple users may have their own electronic device, for example a mobile phone, that may be used to interact with the content being consumed. For example, multiple users may be listening to a radio broadcast in a vehicle. The radio broadcast may ask for user input, for example, in the form of a polling question. Typically, each user would have to invoke a wake command for their specific electronic device and then speak another voice command to answer the polling question. In this situation, having to invoke a wake command results in a disjointed and undesirable user experience. In addition, since multiple users are in close proximity to each other, there is an increased chance that one or more of the electronic devices receives a duplicate or redundant user response from multiple users. Implementing an inaudible signal that alerts the other electronic devices in the vicinity that a user response has been received would allow each user to interact with the electronic device with a natural response, without invoking a wake command, provide a seamless and enjoyable user experience, and avoid duplicate or redundant user responses. In this example, a number of electronic devices may receive responses from multiple users and process one of the received responses based on a voice identification match. The duplicate responses may be stored or discarded.

In another typical situation, multiple electronic devices may be in the vicinity of a user consuming content. For example, the user may be consuming video content in the living room of his home. The video content may include an audio portion that that includes a question requesting user input. The living room may include one or more electronic devices, such as a mobile phone, a voice assistant, or both, that may be used to interact with the content. Typically, the user would have to invoke a wake command for their specific electronic device and then speak another voice command to answer the question. In this situation, having to invoke a wake command results in a disjointed and undesirable user experience. In this example, the user may also have another electronic device, such as a voice assistant, in the kitchen that is capable of interacting with the content. The user may respond to the question in the living room, however, that response may be detected by the mobile phone in the living room, the voice assistant in the living room, the voice assistant in the kitchen, or any combination thereof. Since multiple electronic devices are in close proximity to each other, there is an increased chance that one or more of the electronic devices receives a duplicate or redundant response from the user in the living room. Implementing an inaudible signal that alerts the other electronic devices in the vicinity that a user response has been received would allow the user to interact with the intended electronic device with a natural response, without invoking a wake command, provide a seamless and enjoyable user experience, and avoid duplicate or redundant user responses.

Figure 3:
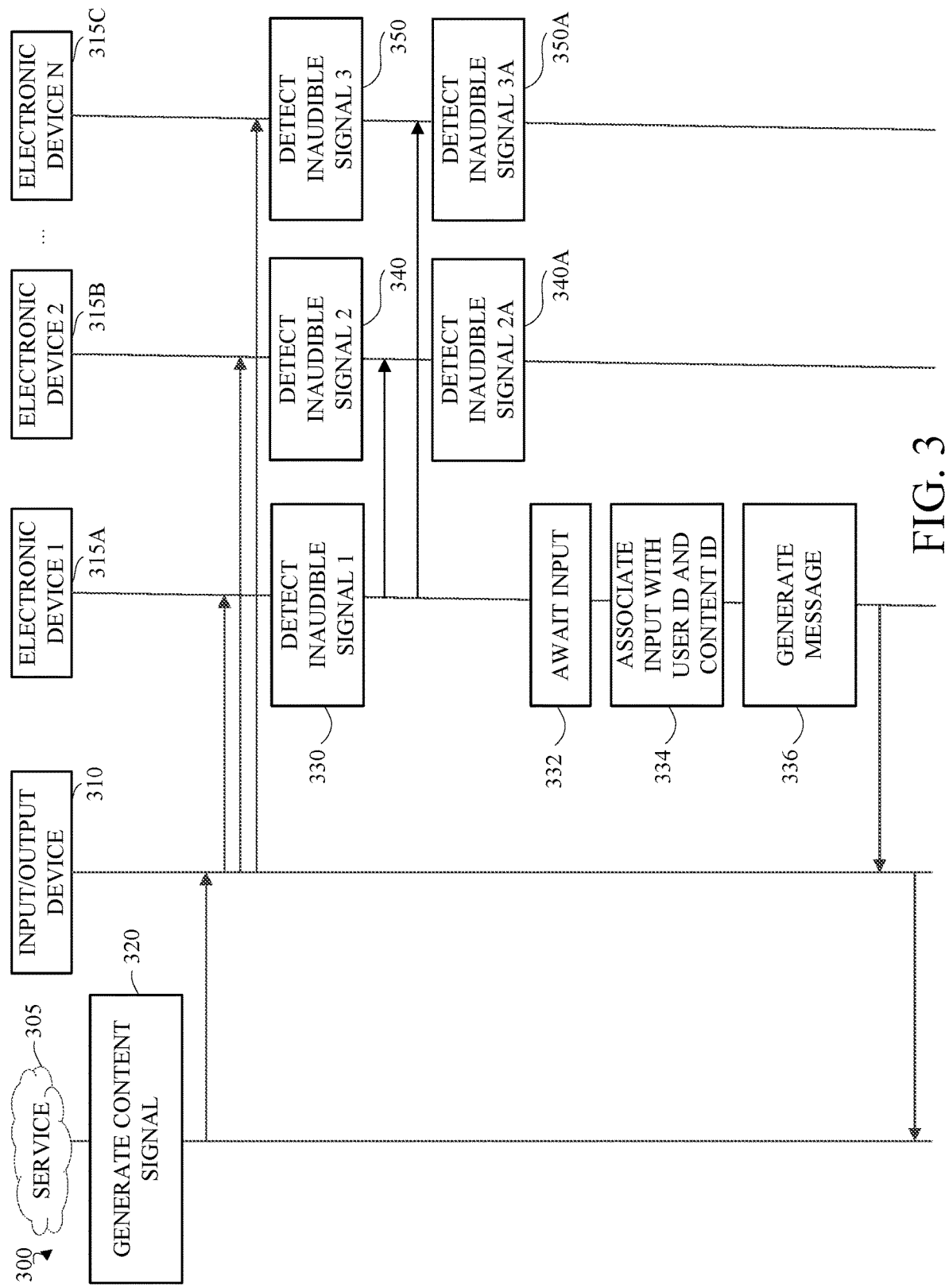
FIG. 3 is a signal diagram of an example of a system for device synchronization in accordance with one or more embodiments of this disclosure.

FIG. 3 is a signal diagram of an example of a system 300 for device synchronization in accordance with one or more embodiments of this disclosure. The system 300 includes a service 305, an input/output device 310, and a number of electronic devices 315A, 315B, 315C. The service 305 may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The input/output device 310 may include content device 110 shown in FIG. 1. The electronic devices 315A, 315B, 315C may be electronic device 200 shown in FIG. 2. Each of the electronic devices 315A, 315B, 315C may receive responses from multiple users and may be configured to process one of the received responses based on a voice identification match. For example, electronic device 315A may only provide a response to the question "what's on my calendar today" after it has determined which calendar is associated with the voice asking the question. A first user and a second user could both link their calendars to the same electronic device. If voice identification match is enabled, the electronic device will respond based on who is asking the question. Each of the electronic devices 315A, 315B, 315C may be programmed such that any user can ask a question, but the system will only log and/or process a request from a known user voice response. In some implementations, the user response may only be forwarded if the listening device authenticates the voice response with the owner of the device.

Referring to FIG. 3, the service 305 is configured to generate 320 a content signal and transmit the content signal to the input/output device 310. The content signal may include an audible signal, a video signal, or both. In an example, the service 305 may include a paired inaudible signal in the transmission that is associated with an audible signal. The input/output device 310 is configured to transmit the audible signal and the inaudible signal to each of the electronic devices 315A, 315B, 315C. The audible signal and the inaudible signal may be transmitted separately or as a multiplexed signal. If the content signal does not include an audible signal that is paired with an inaudible signal, the input/output device 310 may be configured to generate an inaudible signal associated with a content characteristic of the audible signal. The input/output device 310 is configured to transmit each inaudible signal at a frequency based on an electronic device type.

The inaudible signal may include a frequency signature, a wake command, an instruction, a content ID, a source ID, or any combination thereof. The frequency signature may be the frequency at which the inaudible signal is transmitted. The frequency at which the content is transmitted may be one example to avoid constructive interference, destructive interference, or both. The frequency signature may be associated with an electronic device type. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal.

In the example shown in FIG. 3, each of the electronic devices 315A, 315B, 315C are different types of devices. The electronic device 315A is configured to receive an inaudible signal at a first frequency, the electronic device 315B is configured to receive an inaudible signal at a second frequency, and the electronic device 315C is configured to receive an inaudible signal at a third frequency. The different frequencies of the inaudible signals may be used to differentiate device types, device manufacturers, or both. In this example, each of the electronic devices 315A, 315B, 315C may receive a respective inaudible signal at or approximately the same time.

As shown in FIG. 3, the electronic device 315A is configured to detect 330 the inaudible signal transmitted at the first frequency. The electronic device 315A may transmit a respective second inaudible signal to electronic device 315B and electronic device 315C. Each respective second inaudible signal may indicate electronic device 315B and electronic device 315C to ignore the first inaudible signal from the input/output device 310. In an example, the electronic device 315A may transmit the respective second inaudible signal to electronic device 315B and electronic device 315C in response to receiving an input, for example a voice input from a user.

The electronic device 315A may be configured to activate a response monitor. Activating the response monitor may include activating a microphone, for example microphone 220 shown in FIG. 2. Activating the response monitor may be responsive to the frequency signature of the inaudible signal. The electronic device 315A may activate the response monitor for a predetermined time and await an input 332 from a user. The response monitor may be a voice response monitor that is configured to monitor audio inputs for a user input in the form of a voice input. In an example, by activating the response monitor, the electronic device 315A may listen for one or more predetermined user responses and queue a contextual response based on the audio input. In another example, by activating the response monitor, the electronic device 315A may monitor an audio input for a user response, queue a contextual response based on the audio input, and determine whether the user response corresponds to the contextual response. For example, the electronic device 315A may determine a content characteristic of the audible signal based on the inaudible signal. The electronic device 315A may be configured to associate 334 the input with a user ID and a content ID to generate 336 a message based on the content characteristic of the audible signal. The generated message may be a contextual response an may include the user ID, the content ID, and a device ID that identifies electronic device 315A as the source of the generated message. The electronic device 315A may be configured to transmit the message if the electronic device 315A determines that the user response corresponds to the message. The message may be transmitted at any of an ultrasonic frequency, an ultrahigh frequency (UHF), an infrared (IR) frequency, a light fidelity (Li-Fi) frequency, and an electromagnetic frequency capable of transmitting data.

The electronic device 315B is configured to detect 340 the inaudible signal transmitted at the second frequency. In this example, the electronic device 315B receives the second inaudible signal from the first electronic device 315A. The electronic device 315B is configured to receive and detect 340A the second inaudible signal at a second frequency. In this example, the second inaudible signal is detected 340A after the first inaudible signal is detected 340. The second inaudible signal may include an indication to electronic device 315B to ignore the first inaudible signal from the input/output device 310. In this example, the electronic device 315B ignores the first inaudible signal and awaits the next inaudible signal from input/output device 310.

The electronic device 315C is configured to detect 350 the inaudible signal transmitted at the first frequency. In this example, the electronic device 315C receives the second inaudible signal from the first electronic device 315A. The electronic device 315C is configured to receive and detect 350A the second inaudible signal at a third frequency. In this example, the second inaudible signal is detected 350A after the first inaudible signal is detected 350. The electronic device 315C is configured to receive the second inaudible signal at a third frequency. The second inaudible signal may include an indication to electronic device 315C to ignore the first inaudible signal from the input/output device 310. In this example, the electronic device 315C ignores the first inaudible signal and awaits the next inaudible signal from input/output device 310.

The input/output device 310 is configured to receive the message from electronic device 315A. The message may be a contextual response an may include the user ID, the content ID, and a device ID that identifies electronic device 315A as the source of the message. The input/output device 310 is configured to transmit the message to the service 305. The content ID of the transmitted message may instruct an application on service 305 to perform an action.

Figure 4:
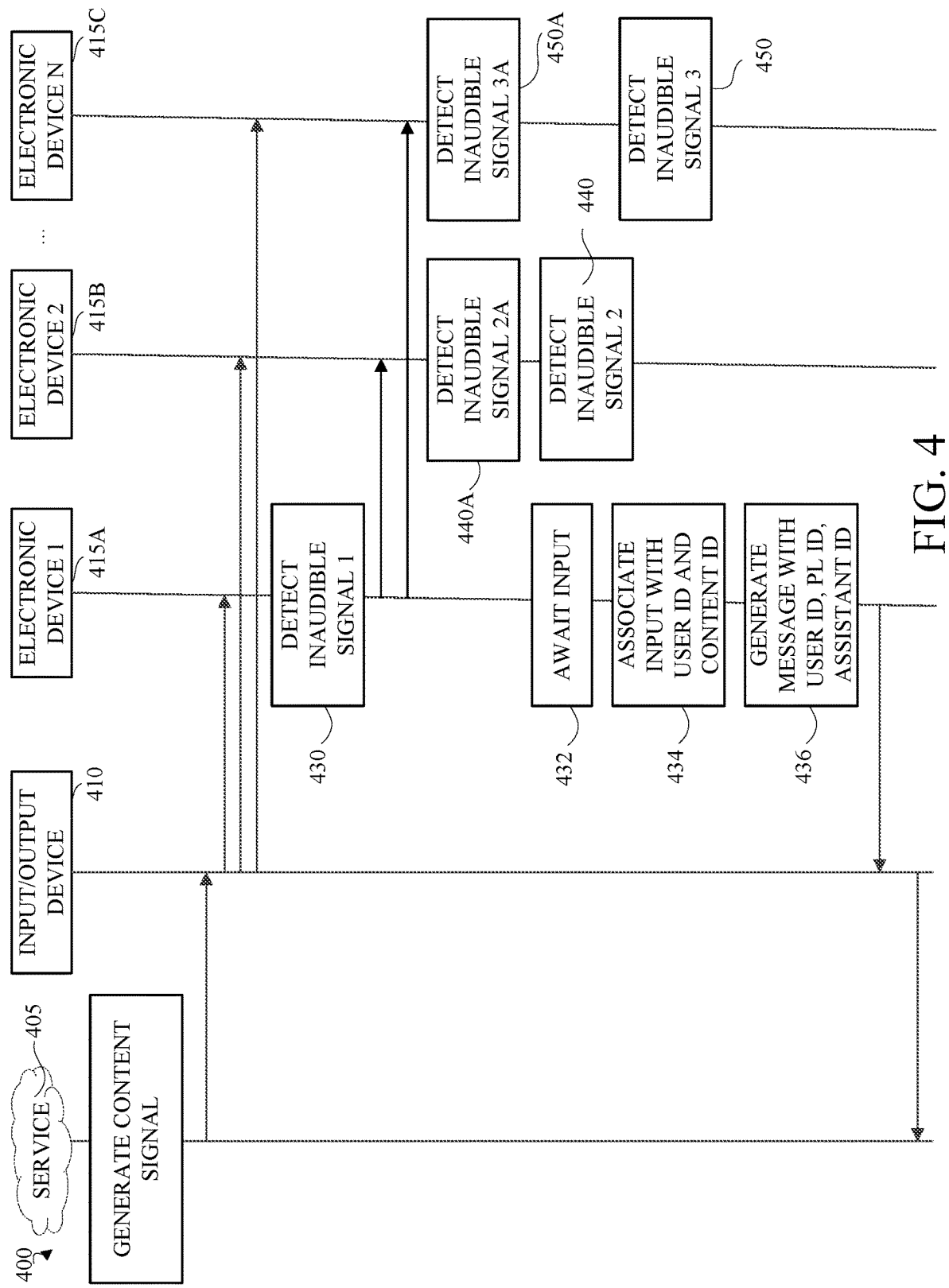
FIG. 4 is a signal diagram of another example of a system for device synchronization in accordance with one or more embodiments of this disclosure.

FIG. 4 is a signal diagram of another example of a system 400 for device synchronization in accordance with one or more embodiments of this disclosure. The system 400 includes a service 405, an input/output device 410, and a number of electronic devices 415A, 415B, 415C. The service 405 may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The input/output device 410 may include content device 110 shown in FIG. 1. The electronic devices 415A, 415B, 415C may be electronic device 200 shown in FIG. 2. Each of the electronic devices 415A, 415B, 415C may receive responses from multiple users and may be configured to process one of the received responses based on a voice identification match. For example, electronic device 415A may only provide a response to the question "what's on my calendar today" after it has determined which calendar is associated with the voice asking the question. A first user and a second user could both link their calendars to the same electronic device. If voice identification match is enabled, the electronic device will respond based on who is asking the question. Each of the electronic devices 415A, 415B, 415C may be programmed such that any user can ask a question, but the system will only log and/or process a request from a known user voice response. In some implementations, the user response may only be forwarded if the listening device authenticates the voice response with the owner of the device.

Referring to FIG. 4, the service 405 is configured to generate 420 a content signal and transmit the content signal to the input/output device 410. The content signal may include an audible signal, a video signal, or both. In an example, the service 405 may include a paired inaudible signal in the transmission that is associated with an audible signal. The input/output device 410 is configured to transmit the audible signal and the inaudible signal to each of the electronic devices 415A, 415B, 415C. The audible signal and the inaudible signal may be transmitted separately or as a multiplexed signal. If the content signal does not include an audible signal that is paired with an inaudible signal, the input/output device 410 may be configured to generate an inaudible signal associated with a content characteristic of the audible signal. The input/output device 410 is configured to transmit each inaudible signal at a frequency based on an electronic device type.

The inaudible signal may include a frequency signature, a wake command, an instruction, a content ID, a source ID, or any combination thereof. The frequency signature may be the frequency at which the inaudible signal is transmitted. The frequency signature may be associated with an electronic device type. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal.

In the example shown in FIG. 4, each of the electronic devices 415A, 415B, 415C are different types of devices.

The electronic device 415A is configured to receive an inaudible signal at a first frequency, the electronic device 415B is configured to receive an inaudible signal at a second frequency, and the electronic device 415C is configured to receive an inaudible signal at a third frequency. The different frequencies of the inaudible signals may be used to differentiate device types, device manufacturers, or both. In this example, the electronic devices 415B, 415C may receive the inaudible signals from the electronic device 415A before receiving the inaudible signals from the input/output device 410.

As shown in FIG. 4, the electronic device 415A is configured to detect 430 the inaudible signal transmitted at the first frequency. The electronic device 415A may transmit a respective second inaudible signal to electronic device 415B and electronic device 415C. Each respective second inaudible signal may indicate electronic device 415B and electronic device 415C to ignore the first inaudible signal from the input/output device 410. In an example, the electronic device 415A may transmit the respective second inaudible signal to electronic device 415B and electronic device 415C in response to receiving an input, for example a voice input from a user.

The electronic device 415A may be configured to activate a response monitor. Activating the response monitor may include activating a microphone, for example microphone 220 shown in FIG. 2. Activating the response monitor may be responsive to the frequency signature of the inaudible signal. The electronic device 415A may activate the response monitor for a predetermined time and await an input 432 from a user. The response monitor may be a voice response monitor that is configured to monitor audio inputs for a user input in the form of a voice input. In an example, by activating the response monitor, the electronic device 415A may listen for one or more predetermined user responses and queue a contextual response based on the audio input. In another example, by activating the response monitor, the electronic device 415A may monitor an audio input for a user response, queue a contextual response based on the audio input, and determine whether the user response corresponds to the contextual response. For example, the electronic device 415A may determine a content characteristic of the audible signal based on the inaudible signal. The electronic device 415A may be configured to associate 434 the input with a user ID and a content ID to generate 436 a message based on the content characteristic of the audible signal. The generated message may be a contextual response an may include the user ID, the content ID, and a device ID that identifies electronic device 415A as the source of the generated message. The electronic device 415A may be configured to transmit the message if the electronic device 415A determines that the user response corresponds to the message. The message may be transmitted at an ultrasonic frequency, an UHF, an IR frequency, a Li-Fi frequency, and an electromagnetic frequency capable of transmitting data.

In this example, the electronic device 415B may receive the second inaudible signal 440A prior to receiving the first inaudible signal 440 transmitted at the second frequency. In this example, the electronic device 415B receives the second inaudible signal 440A from the first electronic device 415A. The electronic device 415B is configured to receive the second inaudible signal at a second frequency. The second inaudible signal may include an indication to electronic device 415B to ignore the first inaudible signal from the input/output device 410. After receiving the second inaudible signal, the electronic device 415B may detect 440 the inaudible signal transmitted at the second frequency. In this example, the electronic device 415B ignores the first inaudible signal and awaits the next inaudible signal from input/output device 410.

In this example, the electronic device 415C may receive the second inaudible signal 450A prior to receiving the first inaudible signal 450 transmitted at the second frequency. In this example, the electronic device 415C receives the second inaudible signal 450A from the first electronic device 415A. The electronic device 415C is configured to receive the second inaudible signal at a second frequency. The second inaudible signal may include an indication to electronic device 415C to ignore the first inaudible signal from the input/output device 410. After receiving the second inaudible signal, the electronic device 415C may detect 450 the inaudible signal transmitted at the second frequency. In this example, the electronic device 415C ignores the first inaudible signal and awaits the next inaudible signal from input/output device 410.

The input/output device 410 is configured to receive the message from electronic device 415A. The message may be a contextual response an may include the user ID, the content ID, and a device ID that identifies electronic device 415A as the source of the message. The input/output device 410 is configured to transmit the message to the service 405. The content ID of the transmitted message may instruct an application on service 405 to perform an action.

Figure 5:
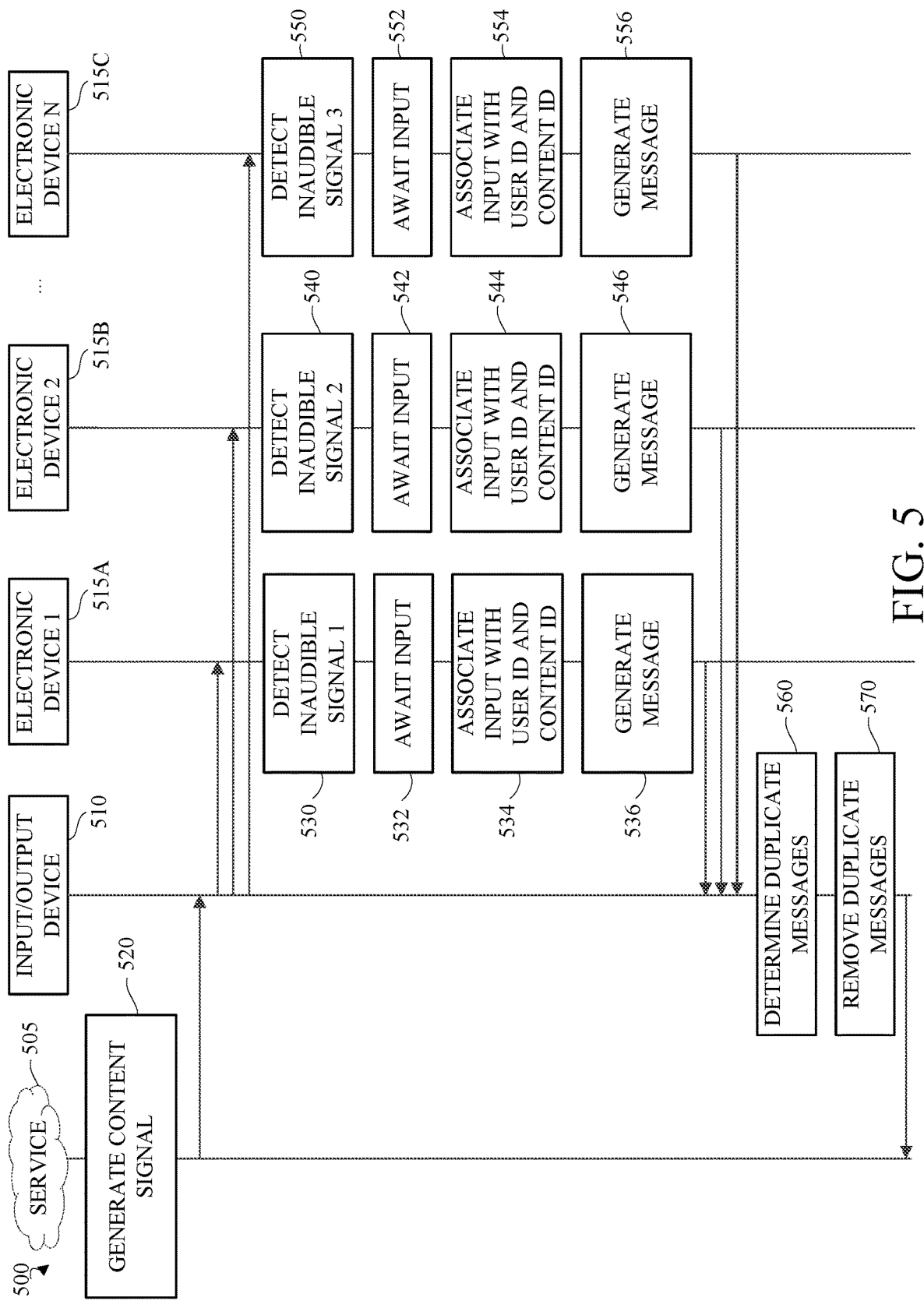
FIG. 5 is a signal diagram of another example of a system for device synchronization in accordance with one or more embodiments of this disclosure.

FIG. 5 is a signal diagram of another example of a system 500 for device synchronization in accordance with one or more embodiments of this disclosure. The system 500 includes a service 505, an input/output device 510, and a number of electronic devices 515A, 515B, 515C. The service 505 may include any service that is capable of providing content, including, for example, terrestrial audio/video service, satellite audio/video service, cloud-based service, and web-based service. A web-based service may be a service that provides a system for applications or computers to communicate with each over the World Wide Web. The web-based service may include machine-to-machine communications. The input/output device 510 may include content device 110 shown in FIG. 1. The electronic devices 515A, 515B, 515C may be electronic device 200 shown in FIG. 2.

Referring to FIG. 5, the service 505 is configured to generate 520 a content signal and transmit the content signal to the input/output device 510. The content signal may include an audible signal, a video signal, or both. In an example, the service 505 may include a paired inaudible signal in the transmission that is associated with an audible signal. The input/output device 510 is configured to transmit the audible signal and the inaudible signal to each of the electronic devices 515A, 515B, 515C. The audible signal and the inaudible signal may be transmitted separately or as a multiplexed signal. If the content signal does not include an audible signal that is paired with an inaudible signal, the input/output device 510 may be configured to generate an inaudible signal associated with a content characteristic of the audible signal. The input/output device 510 is configured to transmit each inaudible signal at a frequency based on an electronic device type.

The inaudible signal may include a frequency signature, a wake command, an instruction, a content ID, a source ID, or any combination thereof. The frequency signature may be the frequency at which the inaudible signal is transmitted. The frequency signature may be associated with an electronic device type. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of the video signal, the inaudible signal, a portion of the inaudible signal such as the instruction, or any combination thereof. The source ID may be included to identify the source of the inaudible signal.

In the example shown in FIG. 5, each of the electronic devices 515A, 515B, 515C are different types of devices. The electronic device 515A is configured to receive an inaudible signal at a first frequency, the electronic device 515B is configured to receive an inaudible signal at a second frequency, and the electronic device 515C is configured to receive an inaudible signal at a third frequency. The different frequencies of the inaudible signals may be used to differentiate device types, device manufacturers, or both.

As shown in FIG. 5, the electronic device 515A is configured to detect 530 the inaudible signal transmitted at the first frequency. The electronic device 515A may be configured to activate a response monitor. Activating the response monitor may include activating a microphone, for example microphone 220 shown in FIG. 2. In some implementations, activating the response monitor may include activating a sensor to detect a user gesture. Activating the response monitor may be responsive to the frequency signature of the inaudible signal. The electronic device 515A may activate the response monitor for a predetermined time and await an input 532 from a user. The response monitor may be a voice response monitor that is configured to monitor audio inputs for a user input in the form of a voice input. In an example, by activating the response monitor, the electronic device 515A may listen for one or more predetermined user responses and queue a contextual response based on the audio input. In another example, by activating the response monitor, the electronic device 515A may monitor an audio input for a user response, queue a contextual response based on the audio input, and determine whether the user response corresponds to the contextual response. For example, the electronic device 515A may determine a content characteristic of the audible signal based on the inaudible signal. The electronic device 515A may be configured to associate 534 the input with a user ID and a content ID to generate 536 a message based on the content characteristic of the audible signal. The generated message may be a contextual response an may include the user ID, the content ID, and a device ID that identifies electronic device 515A as the source of the generated message. The electronic device 515A may be configured to transmit the message if the electronic device 515A determines that the user response corresponds to the message. The message may be transmitted at any of an ultrasonic frequency, an UHF, an IR frequency, a Li-Fi frequency, and an electromagnetic frequency capable of transmitting data.

The electronic device 515B is configured to detect 540 the inaudible signal transmitted at the second frequency. The electronic device 515B may be configured to activate a response monitor. Activating the response monitor may include activating a microphone, for example microphone 220 shown in FIG. 2. Activating the response monitor may be responsive to the frequency signature of the inaudible signal. The electronic device 515B may activate the response monitor for a predetermined time and await an input 542 from a user. The response monitor may be a voice response monitor that is configured to monitor audio inputs for a user input in the form of a voice input. In an example, by activating the response monitor, the electronic device 515B may listen for one or more predetermined user responses and queue a contextual response based on the audio input. In another example, by activating the response monitor, the electronic device 515B may monitor an audio input for a user response, queue a contextual response based on the audio input, and determine whether the user response corresponds to the contextual response. For example, the electronic device 515B may determine a content characteristic of the audible signal based on the inaudible signal. The electronic device 515B may be configured to associate 544 the input with a user ID and a content ID to generate 546 a message based on the content characteristic of the audible signal. The generated message may be a contextual response an may include the user ID, the content ID, and a device ID that identifies electronic device 515B as the source of the generated message. The electronic device 515B may be configured to transmit the message if the electronic device 515B determines that the user response corresponds to the message.

The electronic device 515C is configured to detect 550 the inaudible signal transmitted at the first frequency. The electronic device 515C may be configured to activate a response monitor. Activating the response monitor may include activating a microphone, for example microphone 220 shown in FIG. 2. Activating the response monitor may be responsive to the frequency signature of the inaudible signal. The electronic device 515C may activate the response monitor for a predetermined time and await an input 552 from a user. The response monitor may be a voice response monitor that is configured to monitor audio inputs for a user input in the form of a voice input. In an example, by activating the response monitor, the electronic device 515C may listen for one or more predetermined user responses and queue a contextual response based on the audio input. In another example, by activating the response monitor, the electronic device 515C may monitor an audio input for a user response, queue a contextual response based on the audio input, and determine whether the user response corresponds to the contextual response. For example, the electronic device 515C may determine a content characteristic of the audible signal based on the inaudible signal. The electronic device 515C may be configured to associate 554 the input with a user ID and a content ID to generate 556 a message based on the content characteristic of the audible signal. The generated message may be a contextual response an may include the user ID, the content ID, and a device ID that identifies electronic device 515C as the source of the generated message. The electronic device 515C may be configured to transmit the message if the electronic device 515C determines that the user response corresponds to the message.

The input/output device 510 is configured to receive each respective message from electronic device 515A, electronic device 515B, and electronic device 515C. The input/output device 510 is configured to transmit one of the received messages to the service 505. The input/output device 510 may be configured to determine 560 that two or more of the received messages are redundant messages or duplicate messages. The input/output device 510 may determine 560 that two or more of the received messages are redundant messages or duplicate messages based on the respective content IDs and device IDs. For example, if the content IDs for each of the received messages are identical and the device IDs indicate that the source for the messages are different, the input/output device would determine that the messages are redundant. In an example, the input/output device 510 may be configured to remove 570 the duplicate or redundant messages prior to transmitting one of the received message to the service 505. The content ID of the transmitted message may instruct an application on service 505 to perform an action.

Figure 6:
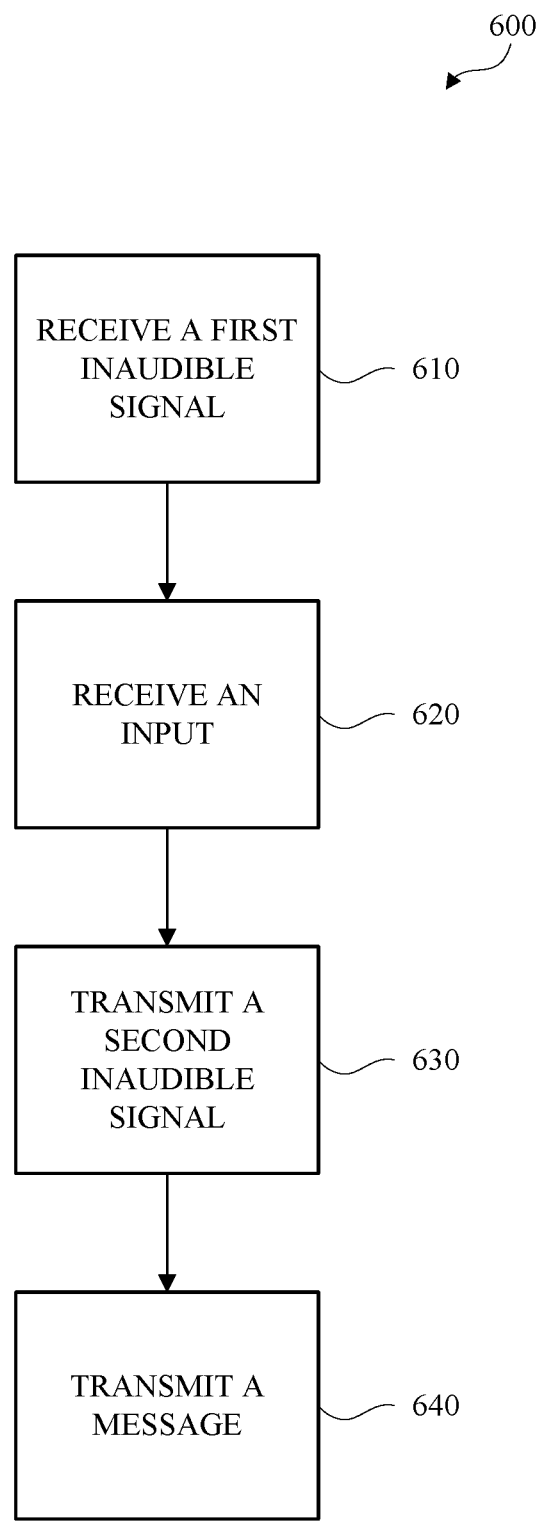
FIG. 6 is a flow diagram of a method for reducing duplicate responses in accordance with one or more embodiments of this disclosure.

FIG. 6 is a flow diagram of a method 600 for reducing duplicate responses in accordance with one or more embodiments of this disclosure. The method 600 includes receiving 610 a first inaudible signal. The first inaudible signal may include a frequency signature, a wake command, an instruction, a content ID, a source ID, or any combination thereof. The frequency signature may be the frequency at which the inaudible signal is transmitted. The frequency signature may be associated with an electronic device type. For example, an inaudible signal directed to a first type of electronic device may be transmitted at a first frequency, and an inaudible signal directed to a second type of electronic device may be transmitted at a second frequency. The wake command is used to wake the electronic device and may be associated with the electronic device type. The content ID may be used to determine a content characteristic, for example, a content context of the video signal. In an example, the content context may include an inference based on the content ID that may influence the meaning or effect of a video signal, the first inaudible signal, a portion of the inaudible signal such as the instruction, or any combination thereof. The source ID may be included to identify the source of the inaudible signal. The first inaudible signal may be associated with a content signal. The content signal may include an audio signal portion, a video signal portion, or both.

The method 600 includes receiving 620 an input. The input may be any type of user input including a voice input, a gesture input, a biometric input, a text input, or any combination thereof. The input may be associated with a user ID. The user ID may be used to authenticate a user with a user account.

The method 600 includes transmitting 630 a second inaudible signal. The second inaudible signal may be transmitted in response to the input. The second inaudible signal may include a frequency signature, an instruction, a source ID, or any combination thereof. The frequency signature may be associated with an electronic device type. For example, an inaudible signal directed to a first type of electronic device may be transmitted at a first frequency, and an inaudible signal directed to a second type of electronic device may be transmitted at a second frequency. The instruction may be an indication to an electronic device to ignore the first inaudible signal. The source ID may be included to identify the source of the second inaudible signal.

The method 600 includes transmitting 640 a message. The message may be based on the input, a content ID of the first inaudible signal, or both. The message may be a contextual response an may include the user ID, the content ID, and the source ID. The message may be transmitted at any of an ultrasonic frequency, an UHF, an IR frequency, a Li-Fi frequency, and an electromagnetic frequency capable of transmitting data.

The method 600 may be implemented in a system that has multiple devices and one user. In this example, all the devices in the system may be registered to the user. The user may respond to content with an input that is received by all of the devices. In some implementations, the determination of whether the input received by each of the devices is a duplicate may be performed by a device such as input/output device 310, 410, 510 in FIGS. 3, 4, and 5, respectively. In some implementations, the determination of whether the input received by each of the devices is a duplicate may be performed by one or more of the devices that receive the input.

The method 600 may be implemented in a system that has multiple devices and one user. In this example, some of the devices in the system may be registered to the user, while other devices in the system may be registered to other users. The user may respond to content with an input that is received by all of the devices. Each of the devices may verify whether the received input is from a registered user. A device may not perform steps 630 and 640 if it is determined that the user is not a registered user. If it is determined that the user is a registered user, the determination of whether the input received by each of the devices is a duplicate may be performed by a device such as input/output device 310, 410, 510 in FIGS. 3, 4, and 5, respectively. In some implementations, the determination of whether the input received by each of the devices is a duplicate may be performed by one or more of the devices that receive the input.

The method 600 may be implemented in a system that has multiple devices and multiple users. In this example, some of the devices in the system may be registered to a first user, while other devices in the system may be registered to a second user. In one example, the first user may respond to content with an input that is received by all of the devices. Each of the devices may verify whether the received input is from a registered user. A device may not perform steps 630 and 640 if it is determined that the first user is not a registered user. If it is determined that the first user is a registered user, the determination of whether the input received by each of the devices registered with the first user is a duplicate may be performed by a device such as input/output device 310, 410, 510 in FIGS. 3, 4, and 5, respectively. In some implementations, the determination of whether the input received by each of the devices is a duplicate may be performed by one or more of the devices that receive the input.

In another example, the second user may respond to content with an input that is received by all of the devices. Each of the devices may verify whether the received input is from a registered user. A device may not perform steps 630 and 640 if it is determined that the second user is not a registered user. If it is determined that the second user is a registered user, the determination of whether the input received by each of the devices registered with the second user is a duplicate may be performed by a device such as input/output device 310, 410, 510 in FIGS. 3, 4, and 5, respectively. In some implementations, the determination of whether the input received by each of the devices is a duplicate may be performed by one or more of the devices that receive the input.

In another example, the first user and the second user may respond to content with an input that is received by all of the devices. Each of the devices may verify whether the received input is from a registered user. A device may not perform steps 630 and 640 if it is determined that the first or second user is not a registered user. If it is determined that the first or second user is a registered user, the determination of whether the input received by each of the devices respectively registered with the first or second user is a duplicate may be performed by a device such as input/output device 310, 410, 510 in FIGS. 3, 4, and 5, respectively. In some implementations, the determination of whether the input received by each of the devices is a duplicate may be performed by one or more of the devices that receive the input.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device comprising:
    a processor;
    a receiver configured to receive an audible signal and an inaudible signal associated with a content characteristic of the audible signal; and
    a transmitter configured to transmit the audible signal and the inaudible signal to a plurality of electronic devices having audio interfaces;
    the receiver further configured to receive a respective message from each of the plurality of electronic devices, each respective message based on the content characteristic and including a respective electronic device identifier; and
    the transmitter further configured to transmit one of the respective messages.

2. The device of claim 1, wherein the processor is configured to determine at least one duplicate message from the respective messages based on the content characteristic and each respective electronic device identifier.

3. The device of claim 2, wherein the processor is further configured to remove the at least one duplicate message.

4. The device of claim 1, wherein the receiver is configured to receive each respective message at any of an ultrasonic frequency, an ultrahigh frequency (UHF), an infrared (IR) frequency, a light fidelity (Li-Fi) frequency, and an electromagnetic frequency capable of transmitting data.

5. The device of claim 1, wherein the inaudible signal includes a content identifier (ID).

6. The device of claim 5, wherein the content characteristic is based on the content ID.

7. The device of claim 5, wherein the inaudible signal includes an instruction associated with an application.

8. The device of claim 1, wherein the transmitter is further configured to transmit one of the respective messages, and wherein the one of the respective messages includes a content ID configured to instruct an application to perform an action.

9. A device comprising:
a processor;
a receiver configured to receive a content signal; and
a transmitter configured to transmit the content signal and an associated inaudible signal to a plurality of electronic devices having audio interfaces;
the receiver further configured to receive a respective message from each of the plurality of electronic devices, each respective message based on the associated inaudible signal and including a respective electronic device identifier; and
the transmitter further configured to transmit one of the respective messages.

10. The device of claim 9, wherein the processor is configured to determine at least one duplicate message from the respective messages based on each respective electronic device identifier.

11. The device of claim 10, wherein the processor is further configured to remove the at least one duplicate message.

12. The device of claim 9, wherein the receiver is configured to receive each respective message at any of an ultrasonic frequency, an ultrahigh frequency (UHF), an infrared (IR) frequency, a light fidelity (Li-Fi) frequency, and an electromagnetic frequency capable of transmitting data.

13. The device of claim 9, wherein the inaudible signal includes a content identifier (ID).

14. The device of claim 13, wherein the inaudible signal includes an instruction associated with an application.

15. The device of claim 9, wherein the transmitter is further configured to transmit one of the respective messages, and wherein the one of the respective messages includes a content ID configured to instruct an application to perform an action.

16. A method comprising:
receiving a first inaudible signal, the first inaudible signal associated with a content signal;
receiving an input;
transmitting a second inaudible signal responsive to the input, the second inaudible signal indicating to an electronic device to ignore the first inaudible signal; and
transmitting a message based on the input and a content identifier (ID) of the first inaudible signal.

17. The method of claim 16, wherein the content signal includes an audible signal.

18. The method of claim 17, wherein the content signal includes a video signal.

19. The method of claim 16, wherein the input is a voice input.

20. The method of claim 16 further comprising: associating the input with a user ID and the content ID.

* * * * *